United States Patent
Asukai

(10) Patent No.: US 9,262,663 B2
(45) Date of Patent: Feb. 16, 2016

(54) IMAGE PROCESSING DEVICE, IMAGE PROCESSING METHOD, AND PROGRAM

(71) Applicant: SONY CORPORATION, Minato-ku (JP)

(72) Inventor: Masamichi Asukai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/352,845

(22) PCT Filed: Oct. 30, 2012

(86) PCT No.: PCT/JP2012/077970
§ 371 (c)(1),
(2) Date: Apr. 18, 2014

(87) PCT Pub. No.: WO2013/080727
PCT Pub. Date: Jun. 6, 2013

(65) Prior Publication Data
US 2014/0246495 A1  Sep. 4, 2014

(30) Foreign Application Priority Data
Dec. 2, 2011 (JP) .................... 2011-264443

(51) Int. Cl.
*G06K 7/00* (2006.01)
*G06K 7/10* (2006.01)
*G06K 7/14* (2006.01)
(52) U.S. Cl.
CPC ............ *G06K 7/1426* (2013.01); *G06K 7/1404* (2013.01); *G06K 7/1491* (2013.01)

(58) Field of Classification Search
CPC ..... G06K 7/12; G06K 7/1404; G06K 7/1426; G06K 7/1495; G06K 7/10722; G06K 7/10732; G06K 7/10841; G06K 2019/06225
USPC ................ 235/435, 454, 462.01–462.49, 469
See application file for complete search history.

(56) References Cited

U.S. PATENT DOCUMENTS

| | | | |
|---|---|---|---|
| 6,572,025 | B1 | 6/2003 | Nishikado et al. |
| 2005/0052551 | A1* | 3/2005 | Tsunoda .................. 348/231.6 |
| 2006/0065733 | A1* | 3/2006 | Lee et al. ................. 235/462.01 |
| 2008/0298688 | A1 | 12/2008 | Cheong et al. |

FOREIGN PATENT DOCUMENTS

| | | |
|---|---|---|
| JP | 63-255783 A | 10/1988 |
| JP | 5-174204 A | 7/1993 |
| JP | 11-39447 A | 2/1999 |
| JP | 11-338966 A | 12/1999 |
| JP | 2001-320573 A | 11/2001 |
| JP | 2002-202924 A | 7/2002 |
| JP | 2002-342702 A | 11/2002 |
| JP | 2008-4101 A | 1/2008 |

OTHER PUBLICATIONS

International Search Report issued Dec. 4, 2012 in PCT/JP2012/077970.

\* cited by examiner

*Primary Examiner* — Laura Gudorf
(74) *Attorney, Agent, or Firm* — Hazuki International, LLC

(57) ABSTRACT

There is provided an image processing device including an image composition unit that generates a composite image by compositing a plurality of color images having differing color components and acquired by image capture, and a code recognition unit that, from the composite image, recognizes an information code formed by a plurality of cells.

8 Claims, 14 Drawing Sheets

IMAGE PROCESSING DEVICE, IMAGE PROCESSING METHOD, AND PROGRAM

TECHNICAL FIELD

The present invention relates to an image processing device, an image processing method, and a program.

BACKGROUND ART

Recently, along with the development of image recognition technology, the use of information codes such as two-dimensional barcodes is proliferating. Specifically, if an information code is printed onto a paper medium, for example, and a captured image of the information code is obtained by an image capture device, it becomes possible to recognize the information code by image recognition, and obtain information according to the recognition result.

Also, as described in Patent Literature 1 to Patent Literature 4, multi-colored information codes, a scanning device for such information codes, are also known. By forming an information code with multiple colors, it becomes possible to handle more information, for example.

CITATION LIST

Patent Literature

Patent Literature 1: JP S63-255783A
Patent Literature 2: JP H5-174204A
Patent Literature 3: JP 2002-342702A
Patent Literature 4: JP H11-338966A

SUMMARY OF INVENTION

Technical Problem

However, according to the above information code scanning device, uniform recognition results are obtained in a variety of environments from the same information code. In other words, with the above information code scanning device, it has been difficult to obtain information according to environment from the same information code.

Consequently, in the present disclosure, a new and improved image processing device, image processing method, and program enabling different recognition results to be obtained from the same information code according to environment are proposed.

Solution to Problem

According to the present disclosure, there is provided an image processing device including an image composition unit that generates a composite image by compositing a plurality of color images having differing color components and acquired by image capture, and a code recognition unit that, from the composite image, recognizes an information code formed by a plurality of cells.

According to the present disclosure, there is provided an image processing method including generating a composite image by compositing a plurality of color images having differing color components and acquired by image capture, and recognizing, from the composite image, an information code formed by a plurality of cells.

According to the present disclosure, there is provided a program causing a computer to function as an image composition unit that generates a composite image by compositing a plurality of color images having differing color components and acquired by image capture, and a code recognition unit that, from the composite image, recognizes an information code formed by a plurality of cells.

Advantageous Effects of Invention

According to the present disclosure as described above, different recognition results may be obtained from the same information code according to environment.

DESCRIPTION OF EMBODIMENTS

Figure 1:
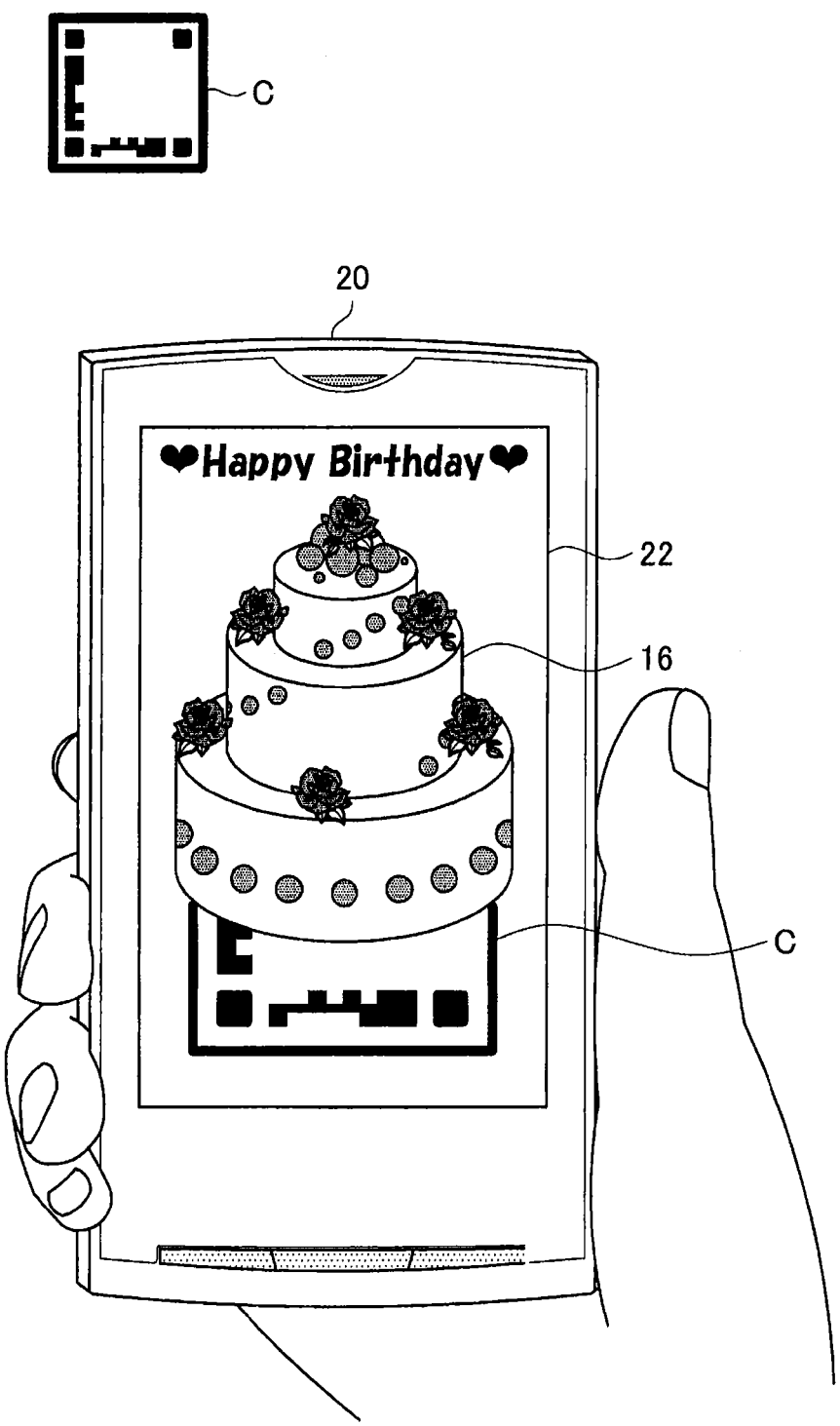
FIG. 1 is a diagram illustrating an exemplary application of an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In this specification and the appended drawings, there may be some cases where structural elements that have substantially the same function and structure are distinguished by denoting a different character or numeral after the same reference numerals. However, in cases where there is there may be no need to particularly distinguish each of the structural elements that have substantially the same function and structure, only the same reference numerals may be denoted.

In addition, the detailed description of the embodiments in this section will be given in the order indicated below.

1. Overview of embodiments of present disclosure
 (Exemplary application of embodiments of present disclosure)
 (Configuration of information code)
 (Lambertian reflectance)
2. First embodiment
2-1. Configuration of mobile device according to first embodiment
2-2. Specific examples of image compositing
2-3. Operation of mobile device according to first embodiment
3. Second embodiment
4. Hardware configuration
5. Conclusion

1. OVERVIEW OF EMBODIMENTS OF PRESENT DISCLOSURE

Technology according to the present disclosure may be carried out in various embodiments, examples of which are described in detail from sections (2. First embodiment) to (3. Third embodiment). Also, an image processing device (mobile device 20) according to each embodiment is equipped with:

A: an image composition unit (230, 232) that generates a composite image by compositing multiple color images having differing color components and acquired by image capture; and B: a code recognition unit (250) that, from the composite image, recognizes an information code formed by multiple cells.

Hereinafter, first, an overview of such embodiments of the present disclosure will be described.

Exemplary Application of Embodiments of Present Disclosure

FIG. 1 is a diagram illustrating an exemplary application of an embodiment of the present disclosure. As illustrated in FIG. 1, an embodiment of the present disclosure is applied to a mobile device 20 that captures an image of an information code C. More specifically, the mobile device 20 is equipped with a display unit 22, and displays content 16 corresponding to a captured information code C on the display unit 22.

Note that in FIG. 1, although a birthday cake is illustrated as the content 16 corresponding to the information code C, the content corresponding to the information code C is not limited thereto. For example, the content corresponding to the information code C may be text, a still image, a motion image, audio, or the like, and may also be user guidance information or advertising information or the like.

Also, in FIG. 1, although a smartphone is illustrated as the mobile device 20 given as an example of an image processing device, the image processing device is not limited to such an example. For example, the image processing device may also be an information processing device such as a personal computer (PC), a home video processing device (such as a DVD recorder or VCR), a personal digital assistant (PDA), a home videogame console, or an electric appliance. Additionally, the image processing device may also be an information processing device such as a mobile phone, a Personal Handy-phone System (PHS), a portable music player, a portable video processing device, or a portable videogame console.

Configuration of Information Code

Figure 2:
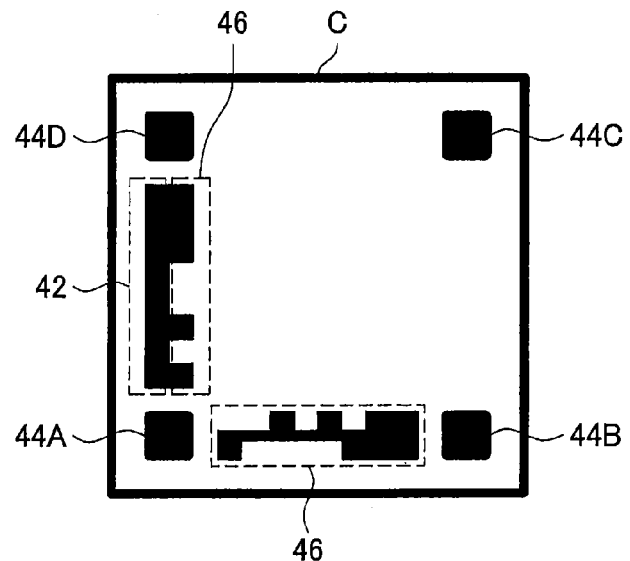
FIG. 2 is an explanatory diagram illustrating an exemplary configuration of an information code.

At this point, the configuration of the information code C will be specifically described with reference to FIG. 2. FIG. 2 is an explanatory diagram illustrating an exemplary configuration of the information code C. As illustrated in FIG. 2, the information code C primarily comprises a logotype cell 42, corner cells 44A to 44D, and a data area 46. The mobile device 20 recognizes the logotype cell 42 and the corner cells 44A to 44D, and then recognizes the information code C on the basis of the arrangement pattern of cells in the data area 46.

Also, in the present embodiment, the information code C comprises multiple cells having differing colors, for example. Such a configuration enables different recognition results to be obtained from the same information code according to environment, as described in detail in section (2. First embodiment). For example, it becomes possible to obtained different recognition results in the case in which the information code C is under fluorescent light versus the case of being under incandescent light, or during the day versus sunset. As a result, the mobile device 20 is able to show the user different content according to the environment.

Note that such an information code C is printed onto a paper medium, for example. The paper medium may be a poster, a business card, a playing card, a calendar, a receipt, the back of copy paper, a flyer, or the like.

Lambertian Diffuse Reflection Model

The mobile device 20 recognizes the information code C on the basis of reflected light from the information code C. Accordingly, before describing each embodiment of the present disclosure, the relationship between incident light and reflected light will be clarified with reference to FIG. 3.

Figure 3:
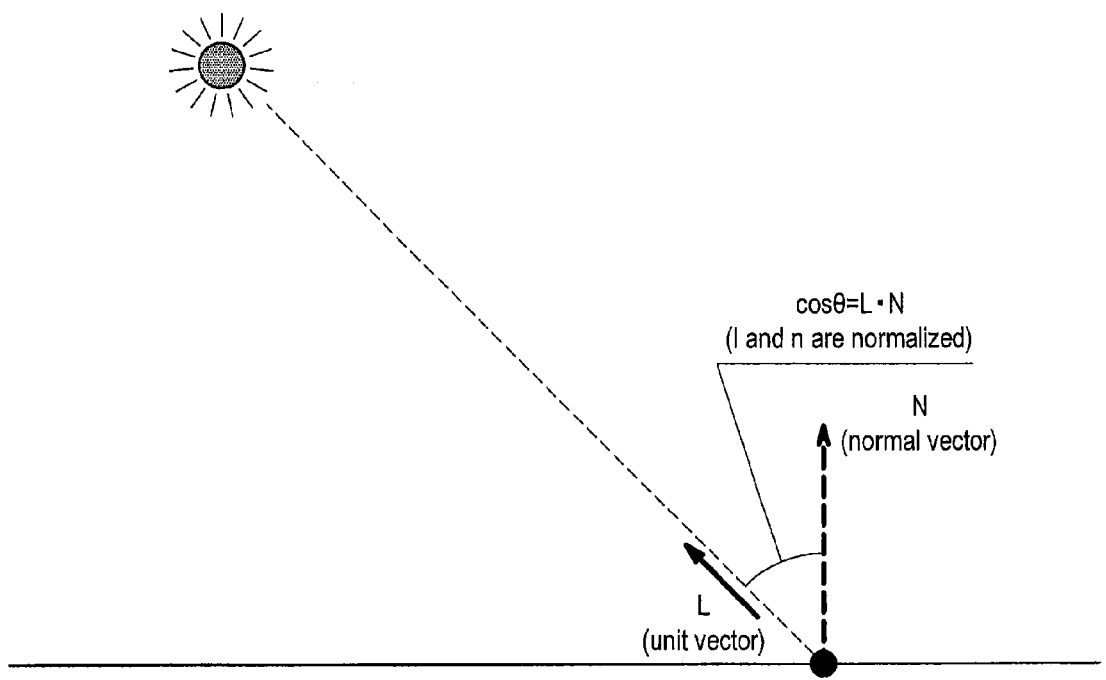
FIG. 3 is an explanatory diagram illustrating a Lambertian diffuse reflection model.

FIG. 3 is an explanatory diagram illustrating a Lambertian diffuse reflection model. Provided that Color is the light source color and Kd is the reflection coefficient, which is the surface color at a target point P, the reflected light I from the target point P is expressed by the following formula 1.

$$I = Kd * \text{Color} * \cos \theta \qquad \text{(Formula 1)}$$

Note that, provided that L is the unit vector from the target point P to the light source and N is the normal vector, $\cos \theta$ in formula 1 is expressed by the following formula 2.

$$\cos \theta = L \cdot N \qquad \text{(Formula 2)}$$

According to the above Lambertian diffuse reflection model, reflected light is produced in the case in which the light source color Color includes the component of the surface color Kd. For example, since reflected light is produced in the case in which the light source color is red and the surface color Kd is red, the target point P appears lighter. On the other hand, since reflected light is not produced in the case in which the light source color is red but the surface color Kd is blue, the target point P appears darker. The respective embodiments of the present disclosure, by utilizing the Lambertian diffuse reflection model discussed above, are able to obtain different recognition results according to environment from the same information code. Hereinafter, such respective embodiments of the present disclosure will be successively described in detail.

2. FIRST EMBODIMENT

2-1. Configuration of Mobile Device According to First Embodiment

Figure 4:
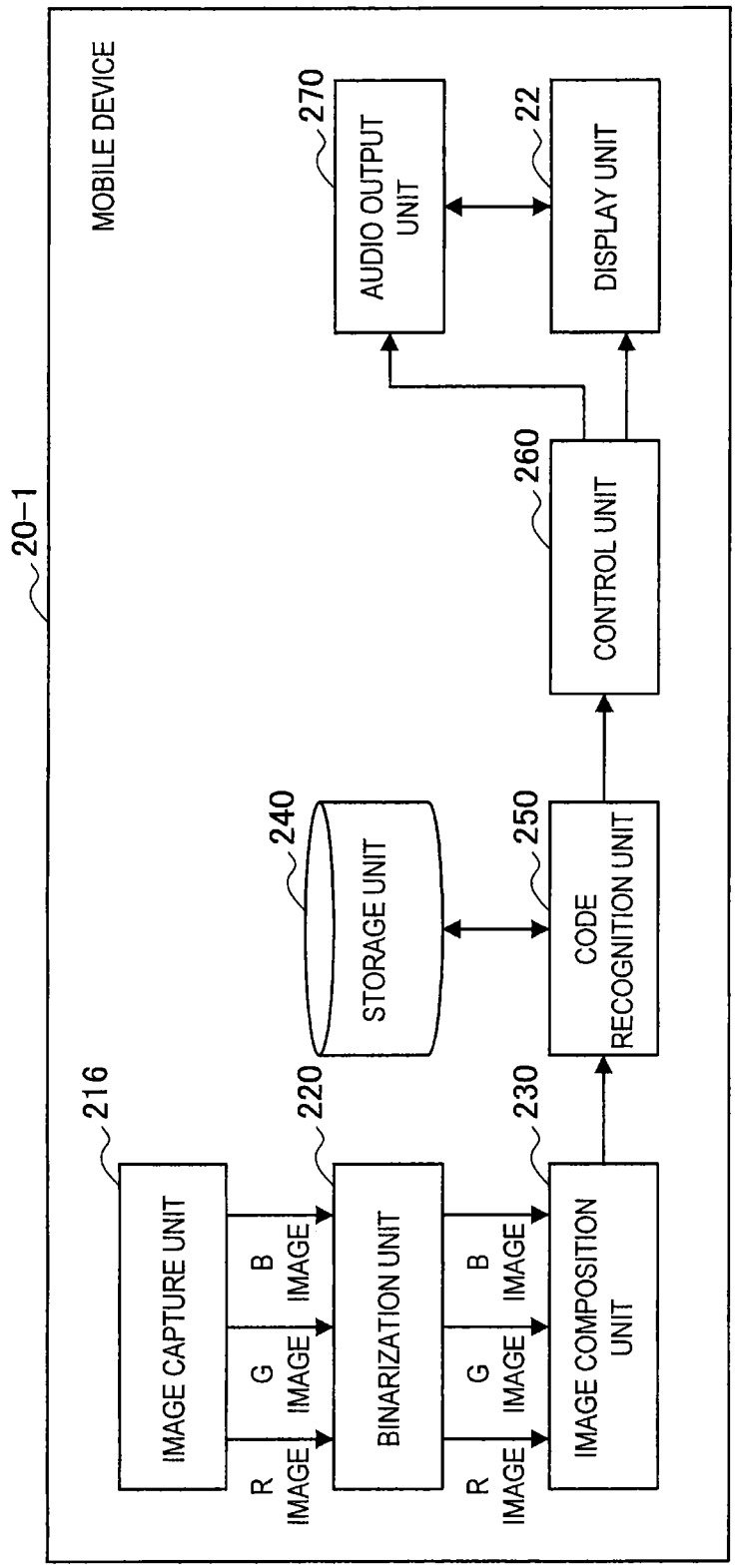
FIG. 4 is a function block diagram illustrating a configuration of a mobile device according to a first embodiment of the present disclosure.

FIG. 4 is a function block diagram illustrating a configuration of a mobile device 20-1 according to the first embodiment of the present disclosure. As illustrated in FIG. 4, the mobile device 20-1 according to the first embodiment is equipped with an image capture unit 216, a binarization unit 220, an image composition unit 230, a storage unit 240, a code recognition unit 250, a control unit 260, an audio output unit 270, and a display unit 22.

Image Capture Unit

The image capture unit 216 captures a subject to acquire a captured image. Specifically, the image capture unit 216 is equipped with a photographic optical system such as a photographic lens and a zoom lens, as well as an image sensor such as a charge-coupled device (CCD) or a complementary metal-oxide-semiconductor (CMOS).

The photographic optical system condenses light emitted from the subject, and forms a subject image on the imaging surface of the image sensor. The image sensor converts the subject image formed by the photographic optical system into an electrical image signal. Herein, the image sensor comprises R component (red) photosensors, G component (green) photosensors, and B component (blue) photosensors, and with the photosensors of each color component, an R image that is the R component detection result, a G image that is the G component detection result, and a B image that is the B component detection result are obtained. Note that in the present embodiment, although an example is described in which the image capture unit 216 obtains three color images having each of an R component, a G component, and a B component, the color images acquired by the image capture unit 216 may also include other color images.

Binarization Unit

The binarization unit 220 binarizes each pixel value in each of the R image, G image, and B image input from the image capture unit 216. For example, the binarization unit 220 sets pixel values less than a threshold to "0", and pixel values equal to or greater than the threshold to "1". Subsequently, the binarization unit 220 outputs the binary R image, G image, and B image to the image composition unit 230.

Image Composition Unit

The image composition unit 230 composites the R image, G image, and B image input from the binarization unit 220 to generate a composite image. Although described in detail in section (2-2. Specific example of image compositing), the image composition unit 230 generates a composite image by taking the logical OR of the color detection areas in each of the R image, G image, and B image, or in other words, the pixel areas set to "1" by the binarization unit 220.

Storage Unit

The storage unit 240 is a storage medium that stores an information code and content in association with each other. For example, the storage unit 240 stores an arrangement pattern of cells in the data area of an information code in association with content. Such a storage unit 240 may be a storage medium such as non-volatile memory, a magnetic disk, an optical disc, or a magneto-optical (MO) disc. The non-volatile memory may be flash memory, an SD card, a microSD card, USB memory, electrically erasable programmable read-only memory (EEPROM), or erasable programmable read-only memory (EPROM), for example. Also, the magnetic disk may be a hard disk, a disk-shaped magnetic material disk, or the like. Also, the optical disc may be a Compact Disc (CD), a Digital Versatile Disc (DVD), a Blu-ray Disc (BD) (registered trademark), or the like.

Code Recognition Unit

The code recognition unit 250 recognizes an information code from a composite image generated by the image composition unit 230. Specifically, the code recognition unit 250 recognizes the logotype cell 42 of an information code, recognizes the corner cells 44A to 44D, and then recognizes the arrangement pattern of cells in the data area 46. Subsequently, the code recognition unit 250 acquires content corresponding to the arrangement pattern of cells in the data area 46 from the storage unit 240. Note that the technique described in JP 2000-82108A, for example, may also be invoked for information code recognition.

Also, the above information code recognition process and content acquisition process may also be realized by cloud computing. In other words, the mobile device 20 may transmit a composite image to a processing server on a network, and the processing server may recognize an information code from the composite image and transmit content corresponding to the information code to the mobile device 20. Furthermore, by having the mobile device 20 transmit each color image to the processing server, it is also possible to generate a composite image on the processing server.

Control Unit

The control unit 260 controls the presentation of content acquired by the code recognition unit 250 to the user. For example, in the case in which the content includes video, the control unit 260 causes the display unit 22 to display the content, and in the case in which the content includes audio, the control unit 260 causes the audio output unit 270 to output audio of the content.

Audio Output Unit

The audio output unit 270 outputs audio of content, under control by the control unit 260. For example, in the case in which the content is audio/video content expressing a beer being poured, the audio output unit 270 outputs the sound made when a beer is poured. Note that such an audio output unit 270 may be speakers, earphones, headphones, or the like.

Display Unit

The display unit 22 displays content, under control by the control unit 260.

For example, the display unit 22 displays a birthday cake 16 as illustrated in FIG. 1. Note that in the case in which content is superimposed onto a captured image, the placement position of the content may also depend on the position and tilt of the information code C in the captured image.

2-2. Specific Example of Image Compositing

The foregoing thus describes a configuration of a mobile device 20-1 according to the first embodiment with reference to FIG. 4. Next, specific examples of image compositing by the image composition unit 230 discussed above will be described.

First Image Compositing Example

FIGS. 5 to 8

First, FIGS. 5 to 8 will be referenced to describe obtaining different composite images under different environments with respect to the same information code C1 comprising black areas and solid-color areas.

Figure 5:
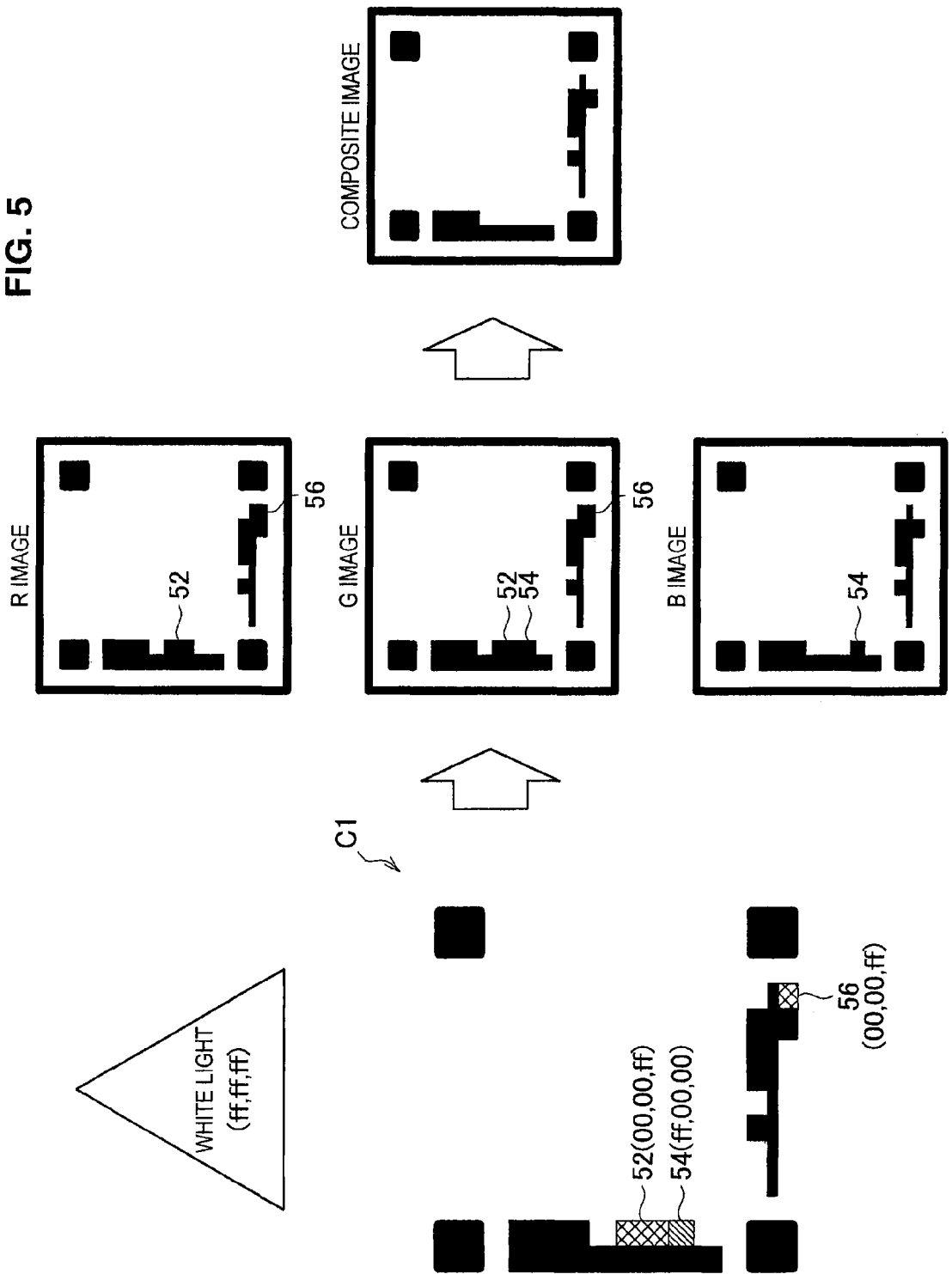
FIG. 5 is an explanatory diagram illustrating a specific example of generating a composite image.

As illustrated in FIG. 5, the information code C1 includes a cell 52 comprising a B component, a cell 54 comprising an R component, and a cell 56 comprising a B component, while other areas comprise a black color. According to the Lambertian diffuse reflection model, reflected light with a B component is produced from the cell 52 and the cell 56 comprising a B component in the case in which a B component is included in the incident light. Additionally, according to the Lambertian diffuse reflection model, reflected light with an R component is produced from the cell 54 comprising an R component in the case in which an R component is included in the incident light. Meanwhile, reflected light is not produced from the other areas comprising a black color.

—White Light—

For this reason, in the case in which the information code C1 is under white light having RGB components as illustrated in FIG. 5, in the R image that is the R component detection result, the cell 52 and cell 56 comprising a B component are formed, while the cell 54 comprising an R component is not formed. Also, in the G image that is the G component detection result, the cell 52 and cell 56 comprising a B component, and the cell 54 comprising an R component, are formed. Also, in the B image that is the B component detection result, the cell 52 and cell 56 comprising a B component are not formed, while the cell 54 comprising an R component is formed.

At this point, since the image composition unit 230 generates a composite image by taking the logical OR of the color detection areas (the areas in which cells are not formed) in each color image, a composite image generated by the image composition unit 230 in the case in which the information code C1 is under white light includes none of the cells 52, 54, and 56, as illustrated in FIG. 5.

—Red Light—

Figure 6:
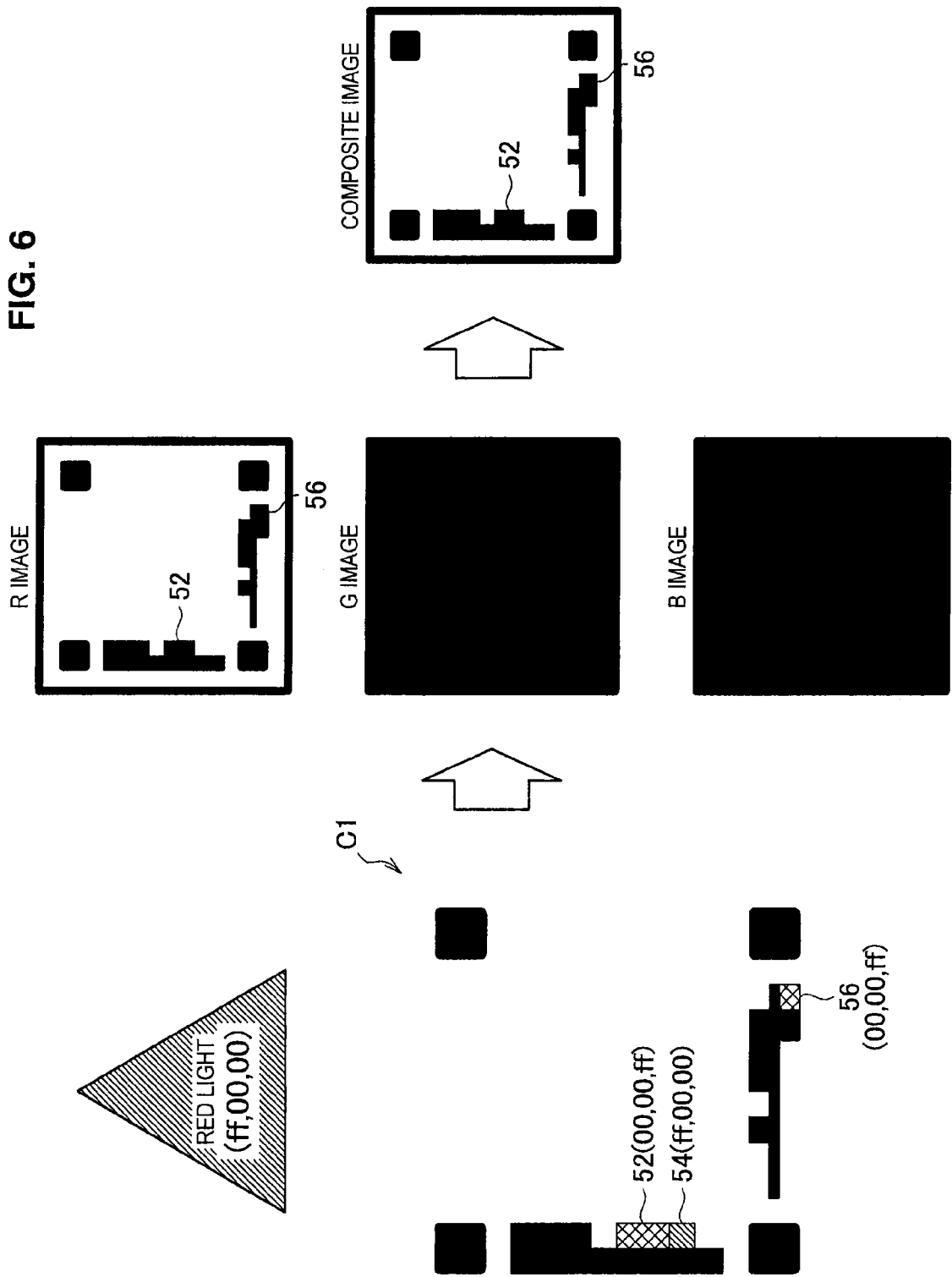
FIG. 6 is an explanatory diagram illustrating a specific example of generating a composite image.

In addition, in the case in which the information code C1 is under red light as illustrated in FIG. 6, in the R image that is the R component detection result, the cell 52 and cell 56 comprising a B component are formed, while the cell 54 comprising an R component is not formed. Also, since reflected light with a G component and reflected light with a B component are not produced at any location in the information code C1, the entirety of the information code C1 becomes a color non-detection area in the G image and the B image, as illustrated in FIG. 6.

For this reason, a composite image generated by taking the logical OR of the color detection areas in the case in which the information code C1 is under red light includes the cells 52 and 56, as illustrated in FIG. 6.

—Green Light—

Figure 7:
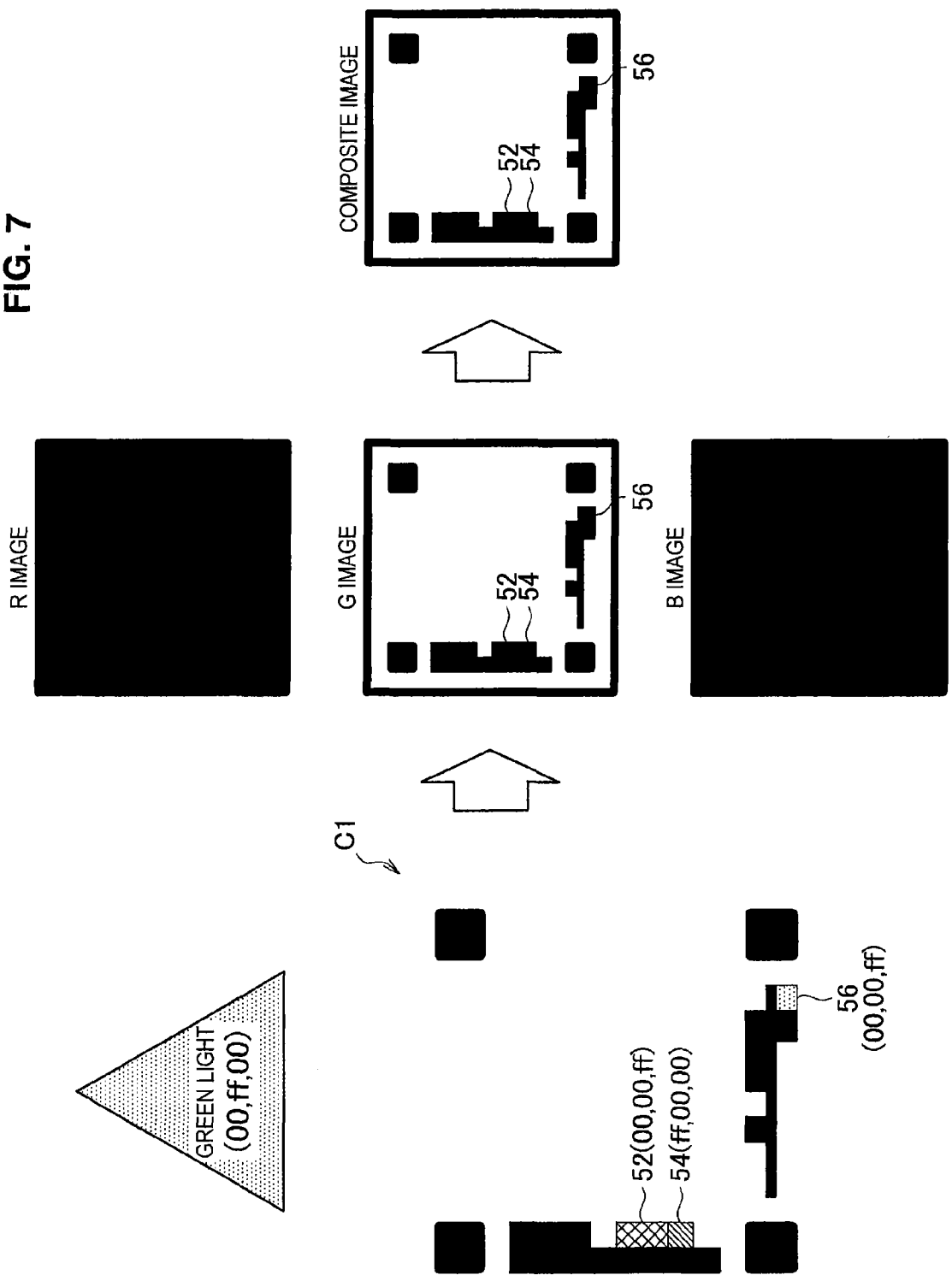
FIG. 7 is an explanatory diagram illustrating a specific example of generating a composite image.

In addition, in the case in which the information code C1 is under green light as illustrated in FIG. 7, in the G image that is the G component detection result, the cell 52 and cell 56 comprising a B component, and the cell 54 comprising an R component, are formed. Also, since reflected light with an R component and reflected light with a B component are not produced at any location in the information code C1, the entirety of the information code C1 becomes a color non-detection area in the R image and the B image, as illustrated in FIG. 7.

For this reason, a composite image generated by taking the logical OR of the color detection areas in the case in which the information code C1 is under green light includes the cells 52, 54, and 56, as illustrated in FIG. 7.

—Blue Light—

Figure 8:
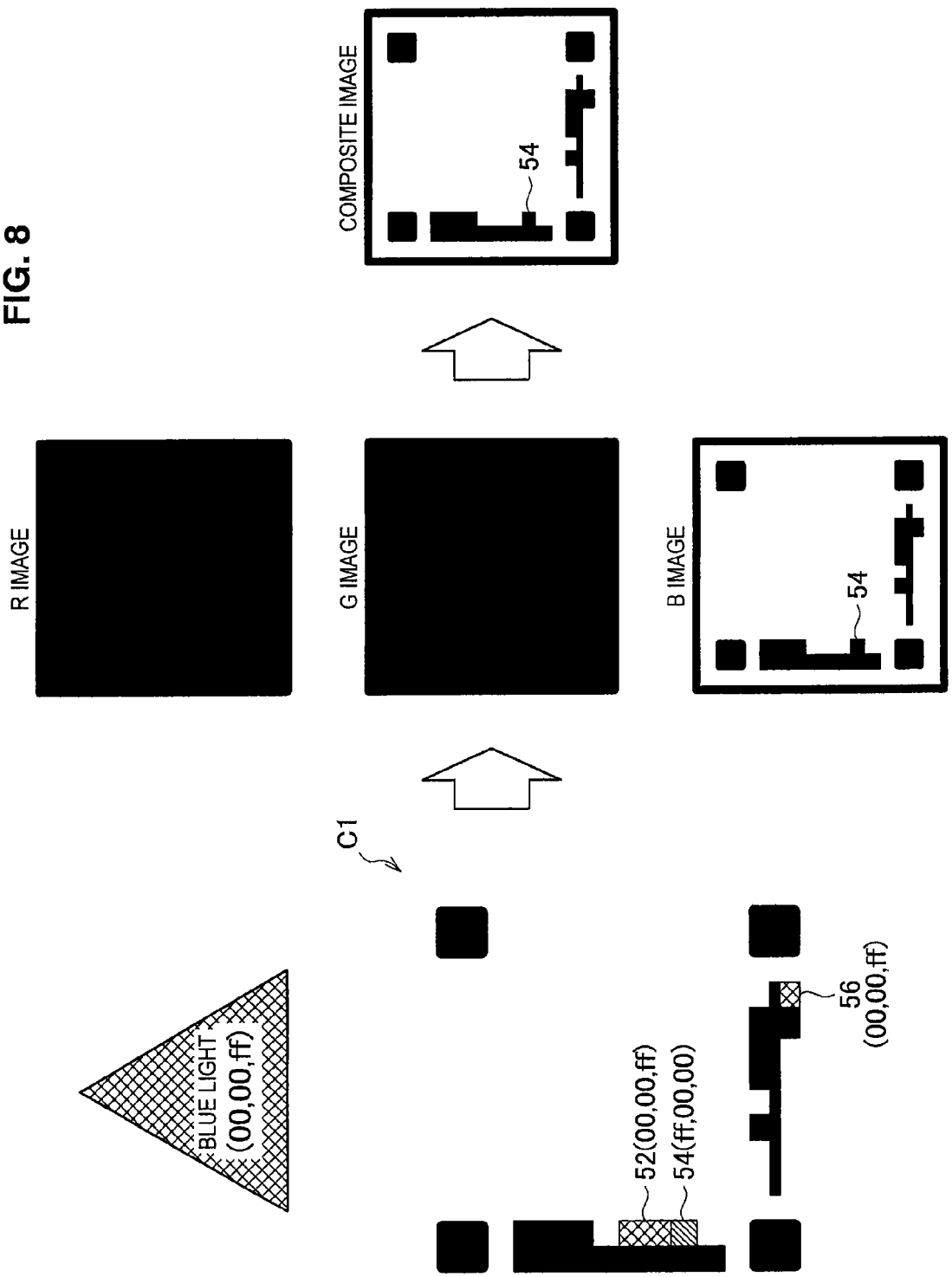
FIG. 8 is an explanatory diagram illustrating a specific example of generating a composite image.

In addition, in the case in which the information code C1 is under blue light as illustrated in FIG. 8, in the B image that is the B component detection result, the cell 52 and cell 56 comprising a B component are not formed, while the cell 54 comprising an R component is formed. Also, since reflected light with an R component and reflected light with a G component are not produced at any location in the information code C1, the entirety of the information code C1 becomes a color non-detection area in the R image and the G image, as illustrated in FIG. 8.

For this reason, a composite image generated by taking the logical OR of the color detection areas in the case in which the information code C1 is under blue light includes the cell 54, as illustrated in FIG. 8.

—Summary of First Image Compositing Example—

As described above, according to the first image compositing example, different composite images according to environment are generated from an information code C1 that includes cells 52 and 56 comprising a B component, and a cell 54 comprising an R component. As a result, it becomes possible to obtain different recognition results as well as content according to environment from the same information code C1.

Second Image Compositing Example

Figure 9:
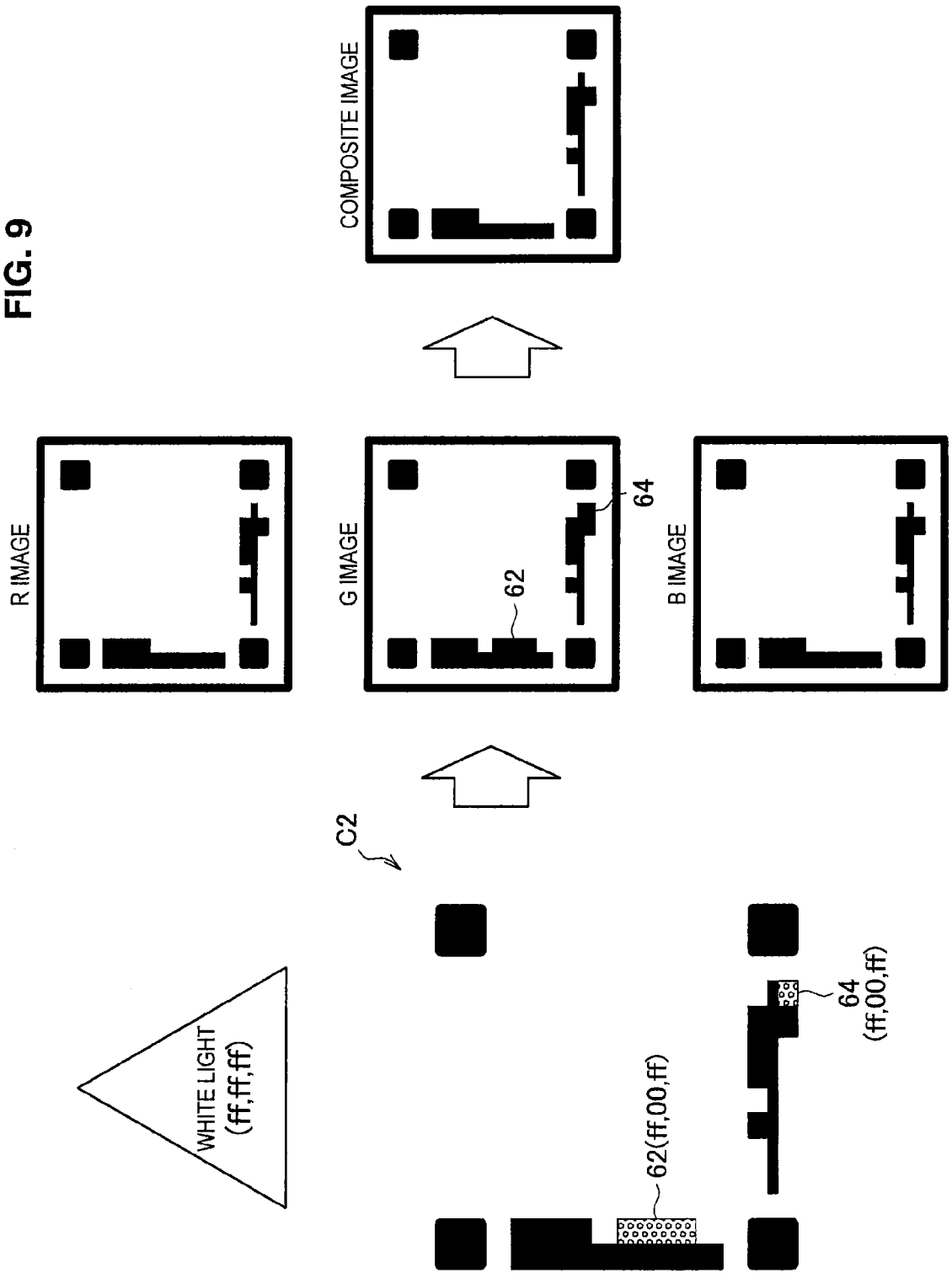
FIG. 9 is an explanatory diagram illustrating a specific example of generating a composite image.
Figure 10:
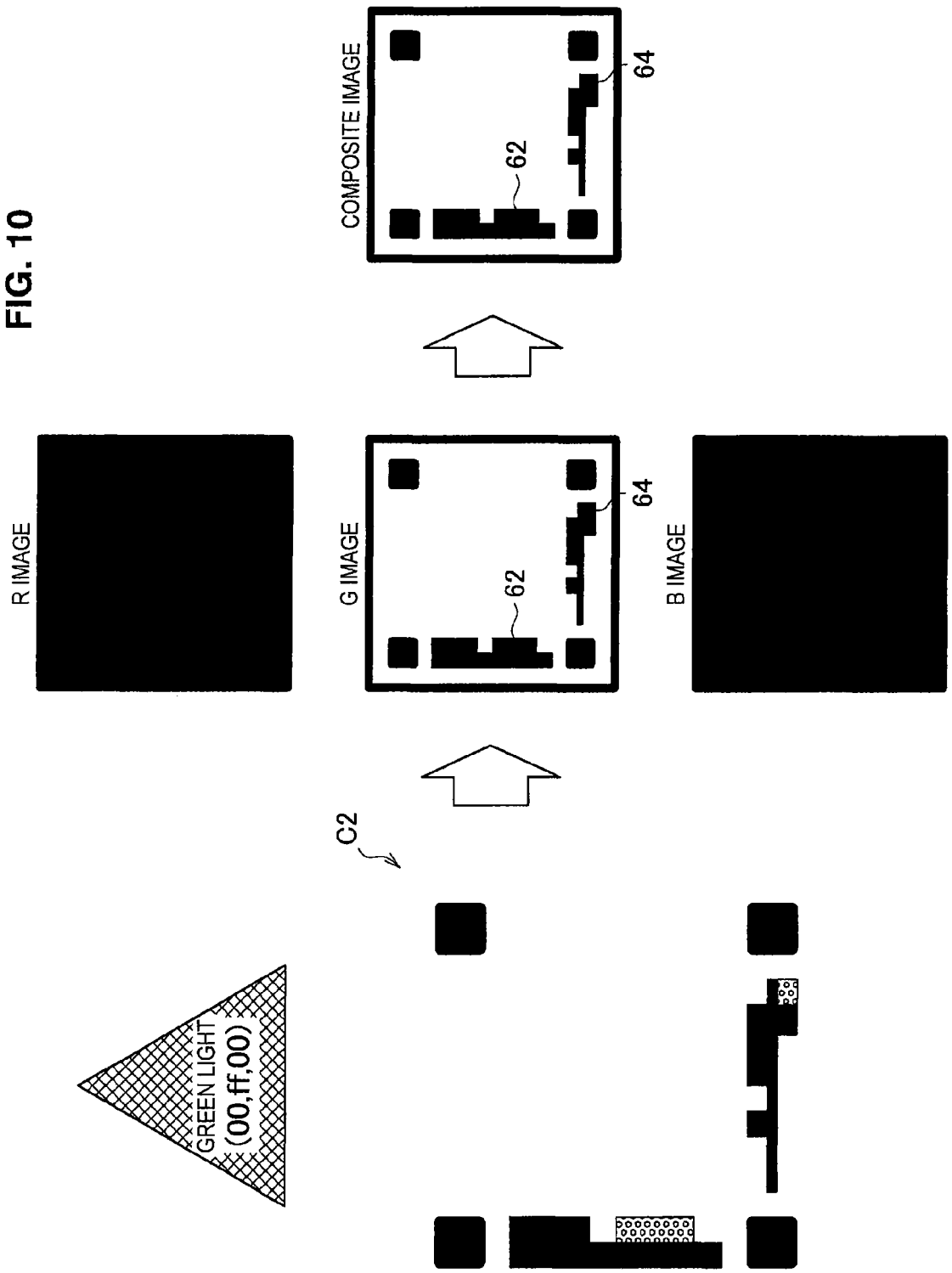
FIG. 10 is an explanatory diagram illustrating a specific example of generating a composite image.

FIGS. 9 and 10

Next, FIGS. 9 and 10 will be referenced to describe obtaining different composite images under different environments with respect to the same information code C2 comprising black areas and mixed-color areas.

As illustrated in FIG. 9, the information code C2 includes cells 62 and 64 comprising a purple color, which is a mixture of an R component and a B component, while other areas comprise a black color. According to the Lambertian diffuse reflection model, from the cells 62 and 64 that include an R component and a B component, reflected light with an R component is produced in the case in which an R component is included in the incident light, while reflected light with a B component is produced in the case in which a B component is included in the incident light. Meanwhile, reflected light is not produced from the other areas comprising a black color.

—White Light—

For this reason, in the case in which the information code C2 is under white light having RGB components as illustrated in FIG. 9, in the R image that is the R component detection result, the cells 62 and 64 that include an R component are not formed. Similarly, in the B image that is the B component detection result, the cells 62 and 64 that include a B component are not formed. On the other hand, in the G image that is the G component detection result, the cells 62 and 64 that do not include a G component are formed.

At this point, since the image composition unit 230 generates a composite image by taking the logical OR of the color detection areas (the areas in which cells are not formed) in each color image, a composite image generated by the image composition unit 230 in the case in which the information code C2 is under white light includes none of the cells 62, and 64, as illustrated in FIG. 9.

—Red Light—

Additionally, in the case in which the information code C2 is under red light, an R image similar to FIG. 9 is obtained. On the other hand, since reflected light with a G component and reflected light with a B component are not produced at any location in the information code C2, the G image and the B image entirely become color non-detection areas. Consequently, in the case in which the information code C2 is under red light, a composite image similar to FIG. 9 is generated by taking the logical OR of each detection area in each color image.

—Green Light—

In addition, in the case in which the information code C2 is under green light as illustrated in FIG. 10, in the G image that is the G component detection result, the cells 62 and 64 that do not include a G component are formed. On the other hand, since reflected light with an R component and reflected light with a B component are not produced at any location in the information code C2, the R image and the B image entirely become color non-detection areas.

For this reason, a composite image generated by taking the logical OR of the color detection areas in the case in which the information code C2 is under green light includes the cells 62 and 64, as illustrated in FIG. 10.

—Blue Light—

Additionally, in the case in which the information code C2 is under blue light, a B image similar to FIG. 9 is obtained. On the other hand, since reflected light with an R component and reflected light with a G component are not produced at any location in the information code C2, the R image and the G image entirely become color non-detection areas. Consequently, in the case in which the information code C2 is under blue light, a composite image similar to FIG. 9 is generated by taking the logical OR of each detection area in each color image.

—Summary of Second Image Compositing Example—

As described above, according to the second image compositing example, different composite images according to environment are generated from an information code C2 that includes cells 62 and 64 comprising a purple color, which is a mixture of an R component and a B component. As a result, it becomes possible to obtain different recognition results as well as content according to environment from the same information code C2.

Third Image Compositing Example

Figure 11:
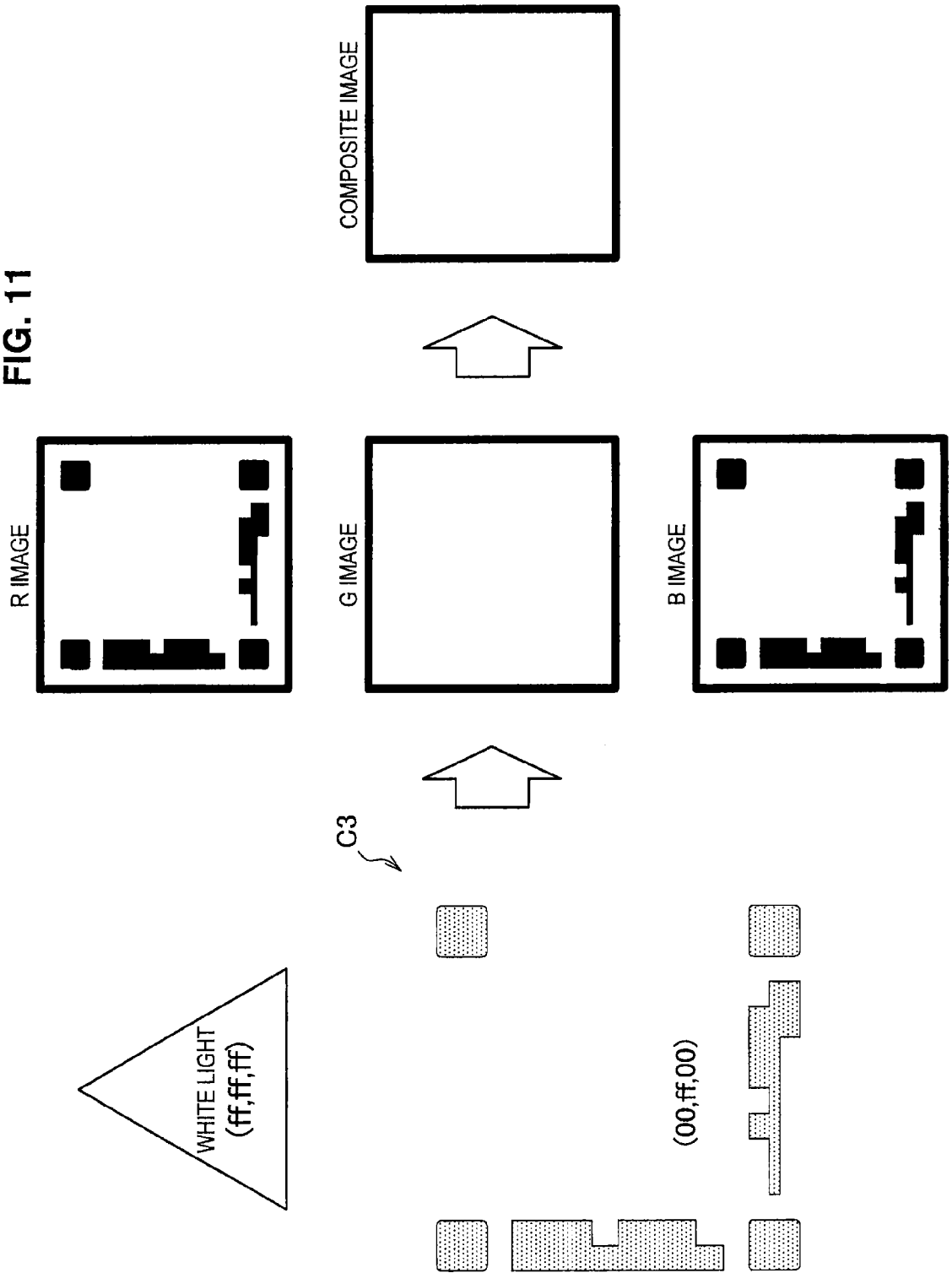
FIG. 11 is an explanatory diagram illustrating a specific example of generating a composite image.
Figure 12:
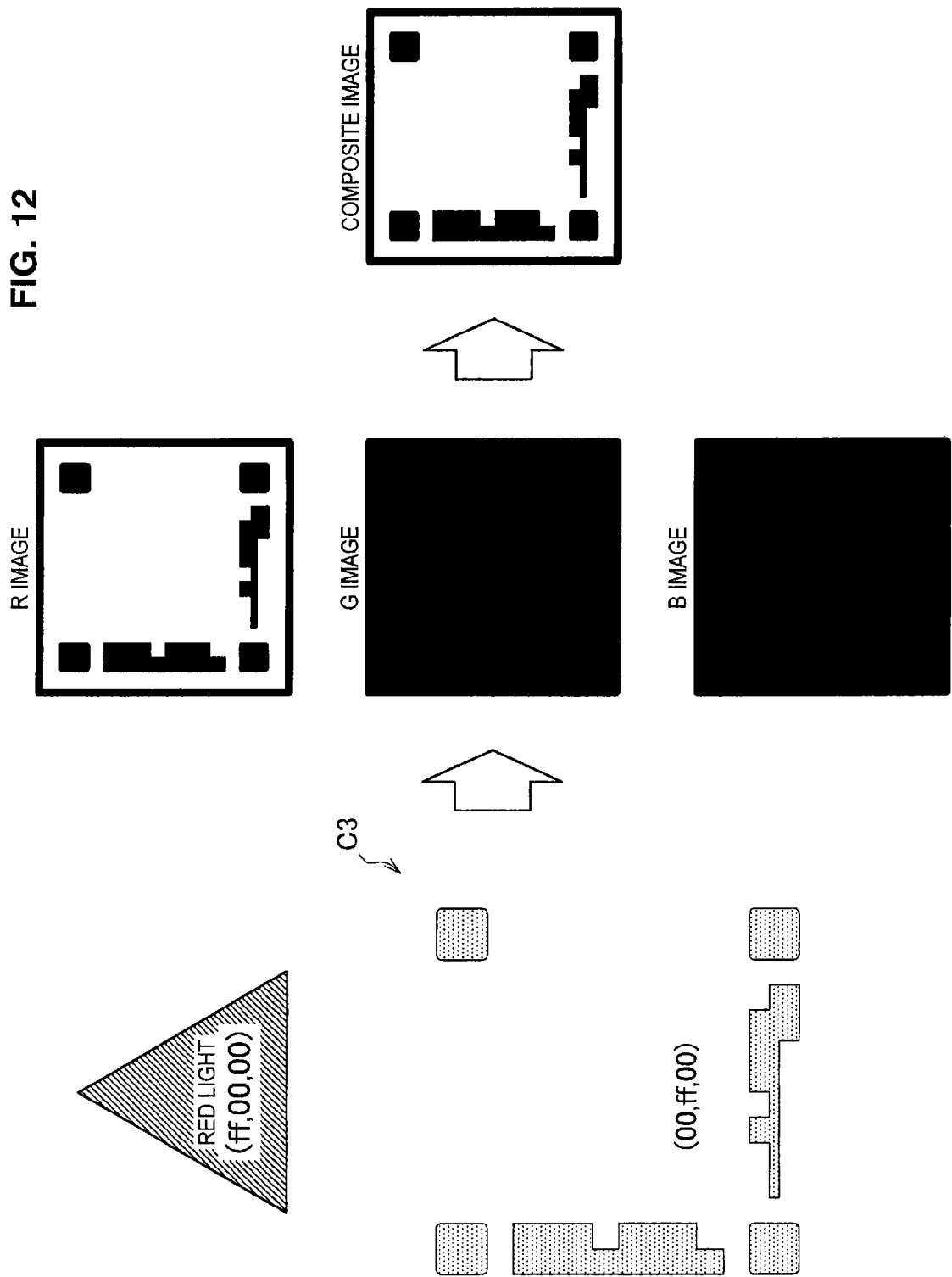
FIG. 12 is an explanatory diagram illustrating a specific example of generating a composite image.

FIGS. 11 and 12

Next, FIGS. 11 and 12 will be referenced to describe obtaining different composite images under different environments with respect to an information code C3 that does not include black areas.

As illustrated in FIG. 11, all cell areas in the information code C3 include a G component. For this reason, according to the Lambertian diffuse reflection model, reflected light with a G component is produced from all cell areas in the information code C3 in the case in which a G component is included in the incident light.

—White Light—

For this reason, in the case in which the information code C3 is under white light having RGB components as illustrated in FIG. 11, reflected light with an R component is not produced from the information code C3, and thus the information code C3 is formed in the R image that is the R component detection result. Also, since reflected light with a G component is produced from all cell areas of the information code C3, the information code C3 is not formed in the G image that is the G component detection result. Also, since reflected light with a B component is not produced from the information code C3, the information code C3 is formed in the B image that is the B component detection result.

At this point, since the image composition unit 230 generates a composite image by taking the logical OR of the color detection areas (the areas in which cells are not formed) in each color image, a composite image generated by the image composition unit 230 in the case in which the information code C3 is under white light does not include the information code C3, as illustrated in FIG. 11.

—Red Light—

Additionally, in the case in which the information code C3 is under red light, an R image with the information code C3 formed thereon is obtained, as illustrated in FIG. 12. On the other hand, since reflected light with a G component and reflected light with a B component are not produced at any location in the information code C3, the G image and the B image entirely become color non-detection areas. Consequently, a composite image generated by taking the logical OR of the color detection areas in the case in which the information code C3 is under red light includes the information code C3, as illustrated in FIG. 12.

—Green Light—

Also, in the case in which the information code C3 is under green light, since reflected light with an R component and reflected light with a B component are not produced at any location in the information code C3, the R image and the B image entirely become color non-detection areas. On the other hand, since reflected light with a G component is produced from all cell areas of the information code C3, the information code C3 is not formed in the G image that is the G component detection result. Consequently, a composite image generated by taking the logical OR of the color detection areas in the case in which the information code C3 is under green light does not include the information code C3, similarly to FIG. 11.

—Blue Light—

Additionally, in the case in which the information code C3 is under blue light, a B image similar to FIG. 11 is obtained. On the other hand, since reflected light with an R component and reflected light with a G component are not produced at any location in the information code C3, the R image and the G image entirely become color non-detection areas. Consequently, a composite image generated by taking the logical OR of the color detection areas in the case in which the information code C3 is under blue light does not include the information code C3, similarly to FIG. 11.

—Summary of Third Image Compositing Example—

As described above, according to the third image compositing example, different composite images according to environment are generated from an information code C3 that does not include black areas. As a result, since the information code C3 is recognized in a specific environment, it becomes possible to obtain content corresponding to the information code C3 in a specific environment.

2-3. Operation of Mobile Device According to First Embodiment

The foregoing thus describes a configuration of a mobile device 20-1 according to the first embodiment, and specific examples of image compositing. Next, operation of a mobile device 20-1 according to the first embodiment will be summarized with reference to FIG. 13.

Figure 13:
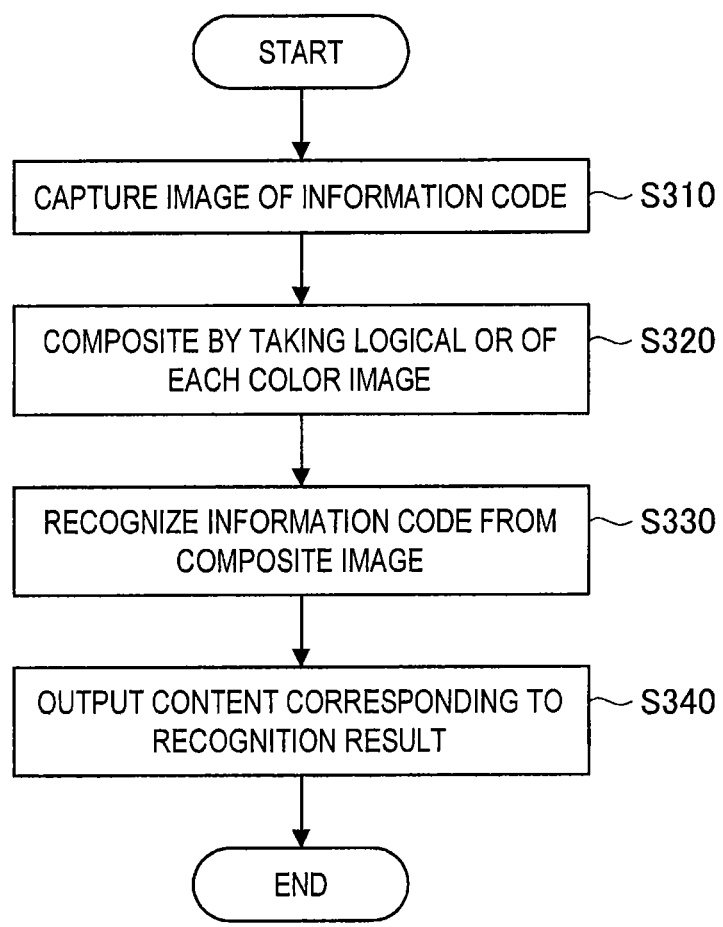
FIG. 13 is a flowchart illustrating operation of a mobile device according to the first embodiment.

FIG. 13 is a flowchart illustrating operation of a mobile client 20-1 according to the first embodiment. As illustrated in FIG. 13, first, when the image capture unit 216 of the mobile device 20-1 captures an image of an information code C, an R image, G image, and B image of the information code C are obtained (S310).

After that, the binarization unit 220 binarizes each color image, and the image composition unit 230 composites the binary images for each color by taking the logical OR of the color detection areas (S320).

Next, the code recognition unit 250 recognizes an information code from a composite image generated by the image composition unit 230, and acquires content corresponding to the recognized information code C from the storage unit 240 (S330). Subsequently, the display unit 22 and the audio output unit 270 output the content corresponding to the information code C, under control by the control unit 260 (S340).

3. SECOND EMBODIMENT

The foregoing thus describes the first embodiment of the present disclosure. Although the first embodiment describes an example of generating a composite image by taking the logical OR of color detection areas, according to the second embodiment, generating a composite image with another method is possible. Hereinafter, such a second embodiment of the present disclosure will be described.

Figure 14:
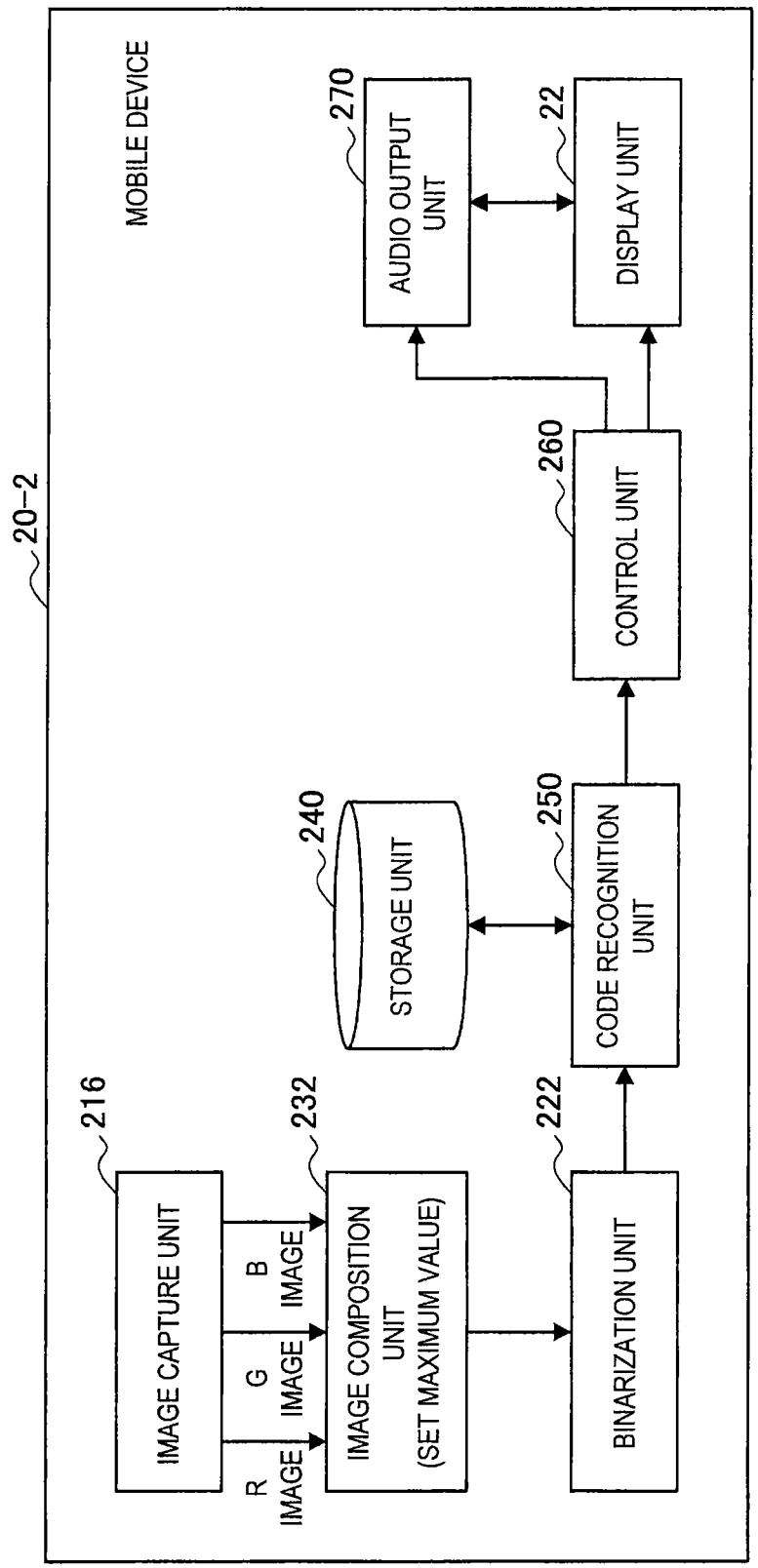
FIG. 14 is a function block diagram illustrating a configuration of a mobile device according to a second embodiment of the present disclosure.

FIG. 14 is a function block diagram illustrating a configuration of a mobile device 20-2 according to the second embodiment of the present disclosure. As illustrated in FIG. 14, the mobile device 20-2 according to the second embodiment is equipped with an image capture unit 216, an image composition unit 232, a binarization unit 222, a storage unit 240, a code recognition unit 250, a control unit 260, an audio output unit 270, and a display unit 22. The image capture unit 216, the storage unit 240, the code recognition unit 250, the control unit 260, the audio output unit 270, and the display unit 22 have a configured as described in the first embodiment, and thus detailed description herein will be reduced or omitted.

An R image, G image, and B image acquired by the image capture unit 216 are input into the image composition unit 232. The image composition unit 232 generates a composite image by setting, for each pixel, the maximum value of the pixel values among the respective color images. For example, in the case in which the R image pixel value is "30", the G image pixel value is "24", and the B image pixel value is "240" for a given pixel, the image composition unit 232 sets the pixel value of that pixel to "240".

The binarization unit 222 binarizes each pixel value of the composite image generated by the image composition unit 232. For example, the binarization unit 222 sets pixel values less than a threshold to "0", and pixel values equal to or greater than the threshold to "1". Subsequently, the binarization unit 222 outputs the binary composite image to the code recognition unit 250.

In this way, it is possible to obtain advantageous effects similar to the first embodiment with a second embodiment that generates a composite image by setting, for each pixel, the maximum value of the pixel values in the respective color images. In other words, with the second embodiment, it is possible to obtain a composite image that is correspondingly similar to the composite image illustrated in FIGS. 5 to 12. Consequently, with the second embodiment, it is likewise possible to obtain different recognition results as well as content according to environment from the same information code C.

4. HARDWARE CONFIGURATION

The foregoing thus describes respective embodiments of the present disclosure. The image composition process and code recognition process discussed in the foregoing is realized by cooperative action between software, and the hardware of the mobile device 20 described below.

Figure 15:
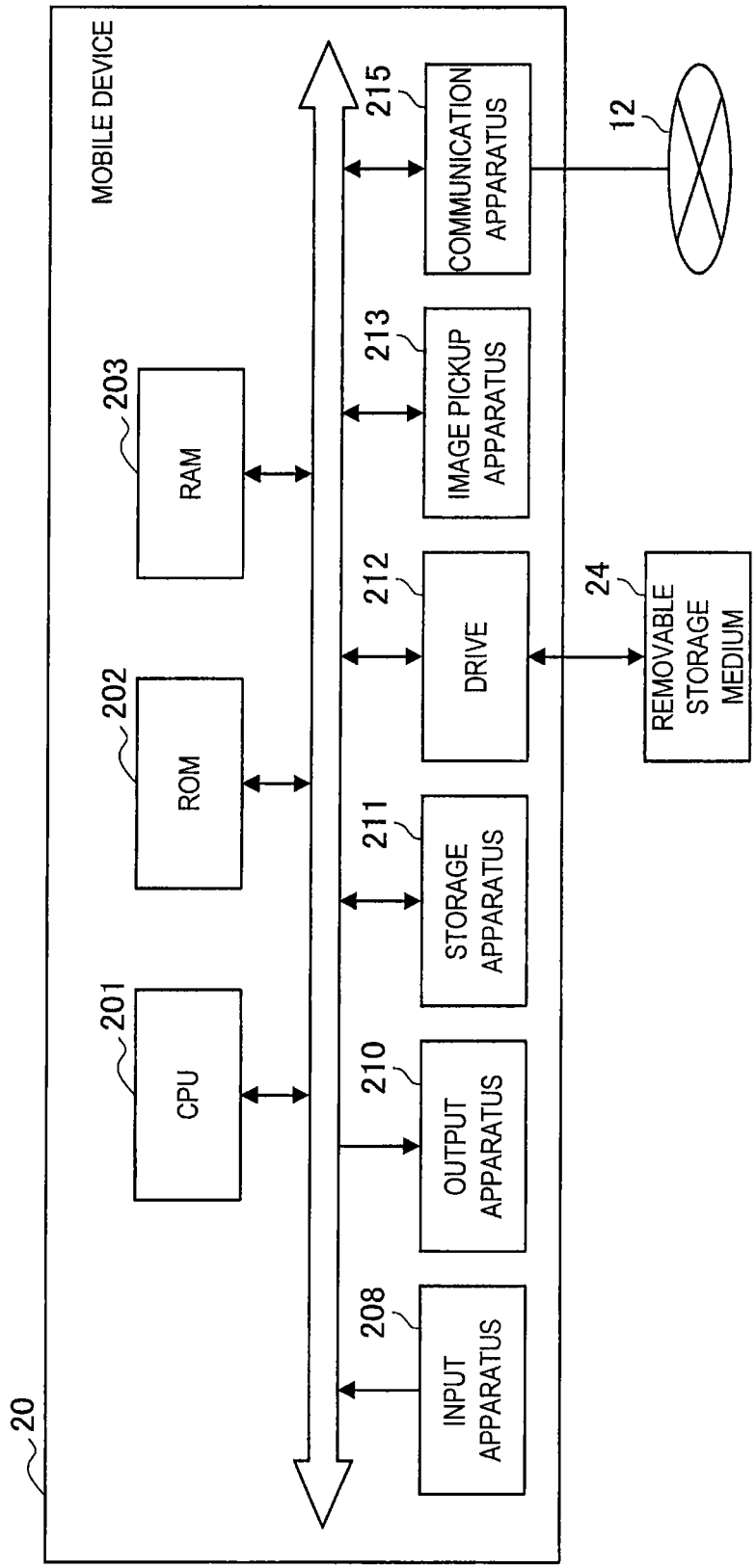
FIG. 15 is an explanatory diagram illustrating a hardware configuration of a mobile device.

FIG. 15 is an explanatory diagram showing a hardware configuration of the mobile device 20. As shown in FIG. 15, the mobile device 20 includes a CPU (Central Processing Unit) 201, ROM (Read Only Memory) 202, RAM (Random Access Memory) 203, an input apparatus 208, an output apparatus 210, a storage apparatus 211, a drive 212, an image pickup apparatus 215, and a communication apparatus 215.

The CPU 201 functions as an operation processing apparatus and a control apparatus, and controls all operations within the mobile device 20, in accordance with various programs. Further, the CPU 201 may be a microprocessor. The ROM 202 stores programs and operation parameters used by the CPU 201. The RAM 203 temporarily stores programs used in the execution of the CPU 201, and parameters which arbitrarily change in these executions. These sections are mutually connected by a host bus configured from a CPU bus or the like.

The input apparatus 208 is constituted with an input means such as a mouse, a keyboard, a touch panel, a button, a microphone, a switch and a lever to input information by a user, and an input controlling circuit to generate an input signal based on the input by the user and to output the signal to the CPU 201. The user of the mobile device 20 can input a variety of data and instruct process operation to the mobile device 20 by operating the input device 208.

The output apparatus 210 includes, for example, a display device such as a liquid crystal display (LCD) apparatus, an OLED (Organic Light Emitting Diode) apparatus, or a lamp. In addition, the output apparatus 210 includes a voice output apparatus such as a speaker or headphones. For example, the display apparatus displays a picked-up image and a generated image. On the other hand, the voice output apparatus converts voice data and outputs a voice.

The storage apparatus 211 is an apparatus for data storage configured as an example of a storage section of the mobile device 20, such as in the present embodiment. The storage apparatus 211 may include a storage medium, a recording apparatus which records data to the storage medium, and an erasure apparatus which erases data recorded in a reading apparatus reading from the storage medium, and the storage medium. The storage apparatus 211 stores the programs executed by the CPU 201 and various data.

The drive 212 is a reader/writer for the storage medium, and is built into the mobile device 20 or is externally attached. The drive 212 reads out information recorded in a removable storage medium 24, such as a mounted magnetic disk, an optical disc, a magneto-optical disc, or semiconductor memory, and outputs the information to the RAM 203. Further, the drive 212 can write information to the removable storage medium 24.

The image pickup apparatus 213 includes an image pickup optical system, such as a photographic lens which converges light and a zoom lens, and a signal conversion element such as a CCD (Charge Coupled Device) or a CMOS (Complementary Metal Oxide Semiconductor). The image pickup system forms a photographic subject in a signal conversion section by converging the light originating from the photographic subject, and the signal conversion element converts the formed photographic subject into an electrical image signal. Note that the image pickup apparatus 213 corresponds to the image capture unit 216 shown in FIGS. 4 and 14.

The communication apparatus 215 is a communication interface constituted with a communication device and the like to be connected to a network 12, for example. Here, the communication apparatus 215 may be a wireless local area network (LAN) compatible communication device, a LTE (Long Term Evolution) compatible communication device or a wired communication device to perform communication with a cable.

Also, the network 12 is a wired or wireless transmission path for information transmitted from an apparatus connected to the network 12. For example, the network 12 may include public line networks such as the Internet, phone line network and satellite communication network, various kinds of LAN's (Local Area Networks) including Ethernet (registered trademark), and a WAN (Wide Area Network). Also, the network 12 may include a dedicated line network such as an IP-VPN (Internet Protocol-Virtual Private Network).

5. CONCLUSION

As described above, according to an embodiment of the present disclosure, different composite images are generated according to environment. As a result, it becomes possible to obtain different recognition results as well as content according to environment from the same information code C.

It should be understood by those skilled in the art that various modifications, combinations, sub-combinations and alterations may occur depending on design requirements and other factors insofar as they are within the scope of the appended claims or the equivalents thereof.

For example, each step in the processes of the mobile device 20 in the present specification may not necessarily be processed in the time series according to the order described as a flow chart. For example, each step in the processes of the mobile device 20 may be processed in parallel, even if each step in the processes of the mobile device 20 is processed in an order different than that of the order described as a flowchart.

Further, a computer program for causing hardware, such as the CPU 201, the ROM 202 and the RAM 203 built into the mobile device 20, to exhibit functions similar to each configuration of the above described mobile device 20 can be created. Further, a storage medium storing this computer program can also be provided.

Additionally, the present technology may also be configured as below.

(1)
An image processing device including:
an image composition unit that generates a composite image by compositing a plurality of color images having differing color components and acquired by image capture; and
a code recognition unit that, from the composite image, recognizes an information code formed by a plurality of cells.

(2)
The image processing device according to (1), wherein the image composition unit generates the composite image by taking a logical OR of color detection areas in the plurality of color images.

(3)
The image processing device according to (1), wherein the image composition unit generates the composite image by setting, for each pixel, a maximum value of pixel values among the plurality of color images.

(4)
The image processing device according to any one of (1) to (3), wherein
the code recognition unit recognizes the information code on the basis of an arrangement pattern of the plurality of cells in the composite image.

(5)
The image processing device according to any one of (1) to (4), wherein
the image processing device further includes a control unit that controls provision of content according to a recognition result by the code recognition unit.

(6)
The image processing device according to any one of (1) to (5), wherein
the image composition unit generates the composite image by compositing a red image, a green image, and a blue image.

(7)
The image processing device according to any one of (1) to (6), wherein
the plurality of cells at least includes a cell having a first color, and a cell having a second color.

(8)
The image processing device according to any one of (1) to (6), wherein
the plurality of cells has a color other than black.

(9)
An image processing method including:
generating a composite image by compositing a plurality of color images having differing color components and acquired by image capture; and
recognizing, from the composite image, an information code formed by a plurality of cells.

(10)
A program causing a computer to function as:
an image composition unit that generates a composite image by compositing a plurality of color images having differing color components and acquired by image capture; and
a code recognition unit that, from the composite image, recognizes an information code formed by a plurality of cells.

REFERENCE SIGNS LIST 1 formula
2 formula
12 network
16 content
20 mobile device
22 display unit
216 image capture unit
220, 222 binarization unit
230, 232 image composition unit
232 image composition unit
240 storage unit
250 code recognition unit
260 control unit
270 audio output unit

The invention claimed is:
1. An image processing device comprising:
circuitry configured to
generate a composite image by compositing a plurality of color images having differing color components, each of the color images being acquired by image capture; and
recognize, from the composite image, an information code formed by a plurality of cells,
wherein the circuitry generates the composite image by setting, for each pixel of the composite image, an intensity value equal to a maximum value among intensity values of corresponding pixels in the plurality of color images and setting, for each pixel, a color corresponding to the maximum value, wherein at least one of the color images acquired by the image capture is different when captured under different color light, and the generated composite image is different when the color images are captured under the different color light.

2. The image processing device according to claim 1, wherein the circuitry recognizes the information code on the basis of an arrangement pattern of the plurality of cells in the composite image.

3. The image processing device according to claim 1, wherein the circuitry is further configured to control provision of content according to the recognized information code.

4. The image processing device according to claim 1, wherein the circuitry generates the composite image by compositing a red image, a green image, and a blue image.

5. The image processing device according to claim 1, wherein the plurality of cells at least include a cell having a first color, and a cell having a second color.

6. The image processing device according to claim 1, wherein the plurality of cells have a color other than black.

7. An image processing method comprising:
   generating a composite image by compositing a plurality of color images having differing color components, each of the color images being acquired by image capture; and recognizing, from the composite image, an information code formed by a plurality of cells, wherein the generating includes setting, for each pixel of the composite image, an intensity value equal to a maximum value among intensity values of corresponding pixels in the plurality of color images and setting, for each pixel, a color corresponding to the maximum value, wherein at least one of the color images acquired by the image capture is different when captured under different color light, and the generated composite image is different when the color images are captured under the different color light.

8. A non-transitory computer-readable storage medium storing computer-readable instructions thereon, which, when executed by a computer, cause the computer to perform an image process method comprising:
   generating a composite image by compositing a plurality of color images having differing color components, each of the color images being acquired by image capture; and recognizing, from the composite image, an information code formed by a plurality of cells, wherein the generating includes setting, for each pixel of the composite image, an intensity value equal to a maximum value among intensity values of corresponding pixels in the plurality of color images and setting, for each pixel, a color corresponding to the maximum value, wherein at least one of the color images acquired by the image capture is different when captured under different color light, and the generated composite image is different when the color images are captured under the different color light.

* * * * *